Feb. 18, 1958 J. J. WETZLER 2,823,734
STRUCTURE FOR FURNITURE AND THE LIKE
Filed June 21, 1954
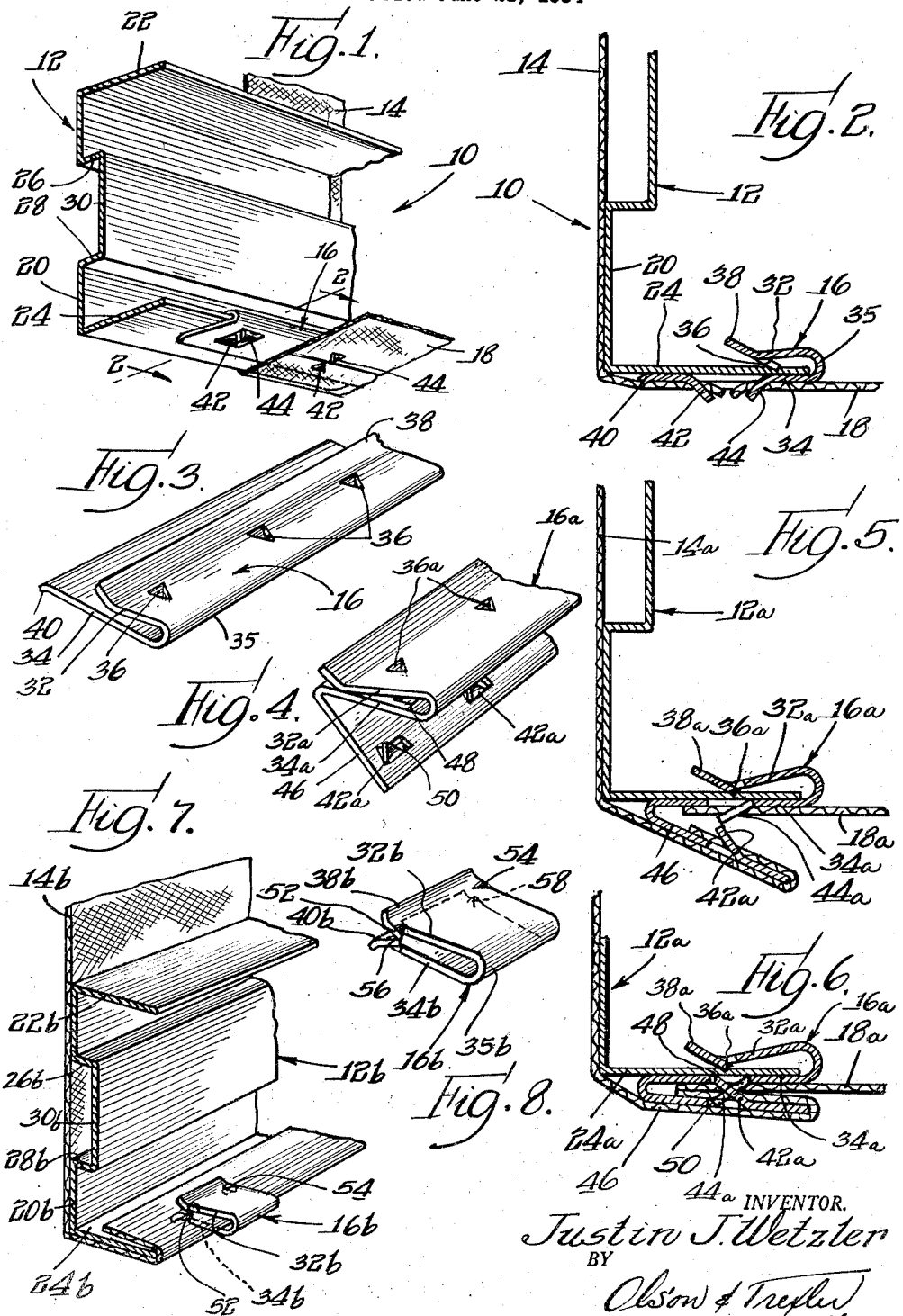
INVENTOR.
Justin J. Wetzler
BY
Olson & Trexler
attys.

United States Patent Office 2,823,734
Patented Feb. 18, 1958

2,823,734

STRUCTURE FOR FURNITURE AND THE LIKE

Justin J. Wetzler, Evanston, Ill., assignor to The Englander Company, Inc., Chicago, Ill., a corporation of Delaware Application June 21, 1954, Serial No. 438,255

8 Claims. (Cl. 155—181)

The present invention relates to a novel structure for use in furniture such as chairs, divans, couches, beds, or vehicle seats and more particularly to a novel structure including a frame member and fabric sections secured together by novel fastening means. This application is a continuation-in-part of my copending application Ser. No. 419,736, filed March 30, 1954.

The present invention contemplates a novel structure for use in various pieces of furniture or box spring units, which structure includes a sheet metal frame member as distinguished from a wooden frame member of the type heretofore in general use for providing frames for box spring units and other portions of various pieces of furniture. The specific structure and advantages of the sheet metal frame member contemplated herein have been set forth and claimed in the above mentioned copending application. The structure of the present invention also includes a fabric section or sections which are connected to the sheet metal frame member. It is a primary object of the present invention to provide such a structure wherein the fabric sections and the sheet metal frame member are secured together in a simple and economical manner.

Another object of the present invention is to provide novel fastening or clip means of simple sheet metal construction whereby one or more fabric sections may be attached to a metal frame member in a secure manner.

A more specific object of the present invention is to provide a novel sheet metal fastener or clip of the above described type which is formed so that at least a portion thereof may securely engage the frame member without interference from the fabric sections so as substantially to reduce any possibility of the fastener becoming inadvertently disassembled from the frame member.

Other objects and advantages of the present invention will become apparent from the following description and the accompanying drawings wherein:

Fig. 1 is a fragmentary perspective view of a structure embodying the principles of the present invention and including a sheet metal frame member, a plurality of fabric sections, and a novel fastener member securing the fabric sections to the frame member;

Fig. 2 is an enlarged fragmentary cross sectional view taken along line 2—2 in Fig. 1;

Fig. 3 is a fragmentary perspective view showing the novel fastener member disclosed in Figs. 1 and 2;

Fig. 4 is a fragmentary perspective view showing a modified form of the novel fastener of this invention;

Fig. 5 is a fragmentary cross sectional view similar to Fig. 2 but showing a structure including the fastener member of Fig. 4 in partially assembled condition;

Fig. 6 is a fragmentary cross sectional view similar to Fig. 5 and further showing the fastener member in fully assembled condition;

Fig. 7 is a fragmentary perspective view showing another modified form of the present invention; and Fig. 8 is a perspective view showing the fastener member disclosed in Fig. 7.

Referring now more specifically to the drawings wherein like parts are designated by the same numerals throughout the various figures, a structure 10 embodying the principles of this invention is shown in Figs. 1 and 2. The structure 10 includes a sheet metal frame member 12, a covering fabric 14 overlying the frame member, and a fastener or clip member 16 for connecting the covering fabric section to the frame member. In instances when the structure 10 is to be used in a box spring unit of the type disclosed in the above mentioned copending application, it may be desired to close the bottom of the frame of the box spring unit, not shown, to prevent the entry of dust and the like, and for this purpose a dust protecting fabric section 18 is provided and is also fastened to the frame member by means of the fastener or clip 16.

The frame member 12 includes an upstanding web portion 20 and upper and lower laterally extending flanges 22 and 24. A longitudinally extending mid-portion of the upstanding web is provided with an inwardly extending channel section which includes laterally extending portions 26 and 28 joined by a portion 30. Various uses and advantages of the channel member 12 have been set forth in the above mentioned copending application and therefore need not be repeated herein.

The fastener member 16 is preferably made from the spring steel and is formed to provide a generally U-shaped transverse cross sectional body having legs 32 and 34 joined by a curved portion 35. As shown best in Fig. 2 the leg 32 is adapted to fit over the upper or inner surface of the frame member flange 24 and this leg is provided with an integral struck out pointed prong 36 which extends inwardly and generally toward the closed end of the fastener for digging into the flange 24 and restraining removal of the fastener from the flange. The leg 34 is adapted to extend along the bottom or outer surface of the flange 24 and it should be noted that the legs are bent or inclined inwardly relative to each other so that the prong 36 is resiliently urged into engagement with the flange 24. In addition, free end portions 38 and 40 of the legs 32 and 34 respectively are flared outwardly to facilitate application of the fastener over the inner edge of the flange. In order to secure the covering fabric 14 and the dust protecting fabric section 18 the fastener member 16 is provided with pointed prongs or barbs 42 and 44 which are integral with and struck from the leg portion 34. As shown best in Fig. 2 the prong 42 is inclined laterally outwardly from the leg 34 and generally inwardly of the frame, not shown, of which the frame member 12 is a part. Thus, the covering fabric may be secured in place by forcing a margin thereof onto the prong 42 and then stretching the fabric around the frame member 12 and any other portion of the box spring unit or furniture structure, not shown, of which the frame member is a part in the usual manner. The prong 44 is similarly inclined downwardly or outwardly from the leg 34 but is generally opposed to the prong 42 for securing the dust protecting fabric section 18 which extends from the frame member 12 in a direction generally opposite to the direction of extension of the covering fabric. With this structure it is seen that the fastening member 16 may be easily applied to the flange 24 of the frame member and that the margins of the fabric sections 14 and 18 may be readily interconnected with the frame member through the prongs 42 and 44 of the fastening member. Furthermore, it should be noted that with the structure just described the fabric sections in no way interfere with the engagement of the prong 36 and the channel 24 so that the prong 36 functions with maximum efficiency to prevent unauthorized or inadvertent disassembly of the fastener member from the flange. As shown best in Figs. 1 and 2 the fastening member or clip 16 is preferably elongated and is provided with a plurality of spaced sets of prongs 36, 42 and 44 for securing the margins of the fabric sections at spaced points. If desired, the length of the fastening member 16 may be made coextensive with the length of the frame member 12 so as to eliminate the need for handling a plurality of fastener members during assembly of the fabric sections to the frame member. However, it is understood that the present invention also contemplates the use of a plurality of relatively short fastening members 16 on the frame member 12, which relatively short fastening members may have one or more sets of prongs. It should also be noted that the transverse length of the leg portion 32 is considerably shorter than the transverse length of the leg portion 34, which arrangement enables a considerable savings in material to be effected without impairing the efficiency of the fastener.

In Figs. 4, 5, and 6 there is shown a modified embodiment of the present invention which is generally similar to the above described structure as indicated by the application of identical reference numerals with the suffix $a$ added to corresponding elements. By referring to the drawings it is seen that this embodiment differs only in the formation and arrangement of the leg portion 34a and the prong 42a of the fastening member 16a. More specifically, it is seen that the leg portion 34a is provided with an extension 46 which is folded back along and at least initially is flared outwardly from the remaining portion of the leg. Furthermore, the prong 42a is struck from the extension 46 and projects inwardly of the extension and generally outwardly of the frame member.

In order to attach the margin of the covering fabric section 14a to the prong 42a, the margin is wrapped around the free edge of extension 46 and forced onto the prong in the manner shown in Fig. 5. Then the extension is folded inwardly as shown in Fig. 6. It should be noted that the prongs 42a and 44a are preferably offset from each other longitudinally of the fastening member 16a so as to avoid interference with each other when the extension 46 is folded to the position shown in Fig. 6. This arrangement also enables the prong 42a to project into the dust protecting fabric section 18a and the prong 44a to project into the covering fabric section 14a as shown in Fig. 6 whereby the fabric sections tend to retain the extension 46 in its fully folded position. If desired, the leg 34a and the extension 46 may be respectively provided with openings 48 and 50 which are adapted to receive the tips of the prongs 42a and 44a to permit maximum folding or collapsing of the extension 46 without collapsing of the prongs. It should also be noted that as the extension 46 is folded from the position shown in Fig. 5 to the Fig. 6 position the covering fabric section 14a will be placed under tension which tends to provide the covering fabric with a neat wrinkle-free appearance.

In Figs. 7 and 8 there is shown another modified form of the present invention which may be utilized in instances when the dust protecting fabric section may be omitted and when an even more economical structure is desired. This embodiment is similar to the above described structure 10 as indicated by the application of identical reference numerals with the suffix $b$ added to corresponding elements and differs only in the form of the fastening member or clip 16b and in the fact that the above described dust protecting fabric has been eliminated. In this embodiment the fastening member or clip 16b includes leg portions 32b and 34b joined together by a curved section 35b to provide a generally U-shaped body. The leg portion 32b is provided with inwardly struck prongs or barbs 52 and 54 located toward its free end and adjacent its opposite margins, and the leg portion 34b is provided with similar prongs 56 and 58. With this structure the covering fabric is secured to the frame member by wrapping the margin of the covering fabric around the flange 24b whereupon the spring fastening member 16b is snapped over the flange and the fabric. The barbs or prongs 52 through 58 project through the fabric and dig into the flange for preventing disassembly of the clip from the flange. While only one clip or fastening member 16b is illustrated, it is understood that a plurality of these clips should be spaced along the entire length of the frame member.

From the above description it is seen that the present invention has provided a novel structure for furniture and the like, which structure includes a metal frame member and one or more fabric sections attached to the frame member in a simple and economical manner by means of fastening clips. Furthermore, it is seen that the present invention has provided novel fastening clips which may be economically manufactured from sheet metal and which are operable securely to hold the fabric sections and the frame member in assembled relationship.

While the preferred embodiments of the present invention have been shown and described herein it is obvious that many structural details may be changed without departing from the spirit and scope of the appended claims.

The invention is claimed as follows:

1. A fastening member for securing fabric means to a metal frame member, comprising generally U-shaped clip means for embracing a marginal edge of said frame member, said clip means having one leg for extending along an inner surface of said frame member, projection means struck inwardly from said one leg and extending toward the closed end of the U for digging into said frame member for restraining removal of the clip means from the frame member, a second leg for extending along an outer surface of said frame member, and projection means struck from said second leg and including a prong flared away from said first mentioned leg and adapted to be embedded in the fabric means for securing the fabric means to the frame member.

2. A fastening member, as defined in claim 1, wherein said projection means struck from said second leg includes a second prong, one of said prongs being adapted to secure one fabric section extending from the frame member in one direction, and the other of said prongs being adapted to secure another fabric section extending from the frame member in the opposite direction.

3. A fastening member, as defined in claim 1, wherein said second leg includes a portion for extending along said frame member and an integral reversely bent extension flaring outwardly from said portion, and wherein said projection means includes said first mentioned prong struck from said leg portion for impinging a fabric panel extending from said frame member in one direction, and a second prong struck inwardly from said reversely bent extension for impinging a fabric panel extending from the frame member in an opposite direction.

4. A fastening member for securing fabric means and the like to a metal frame member comprising a sheet material member having a generally U-shaped transverse cross section and including a pair of legs extending from the closed end of the U, integral projection means struck from one of said legs and extending inwardly and generally toward the closed end of the U for engaging the frame member, and integral projection means struck from said other leg and including prong means extending away from the closed end of the U for piercing the fabric means and securing the same.

5. A fastening device, as defined in claim 4, wherein said last mentioned projection means includes a pair of generally oppositely extending prongs inclined outwardly from said second leg, one of said prongs being adapted to secure a fabric section extending in one direction and the other of said prongs being adapted to secure a fabric section extending in the opposite direction.

6. A fastening member, as defined in claim 4, wherein said sheet material U-shaped member is elongated, and wherein said first mentioned projection means includes a plurality of longitudinally spaced prongs integral with and struck from said one leg for engaging the frame member, and said second mentioned projection means includes a plurality of longitudinally spaced prongs extending away from the closed end of said U and integral with and struck from said other leg for securing the fabric means.

7. A fastening member, as defined in claim 4, wherein said other leg includes a portion extending from the closed end of the U and generally along said one leg and a reversely bent extension, and wherein said projection means in said other leg includes additional prong means integral with and struck from said reversely bent extension, said second mentioned prong means being adapted to secure another fabric section, and said reversely bent extension being foldable toward said leg portion after the fabric sections have been secured on said prong means.

8. A fastening member, as defined in claim 7, wherein said first and second mentioned prong means are offset from each other to prevent interference with each other when said reversely bent extension is folded toward said leg portion.

References Cited in the file of this patent
UNITED STATES PATENTS

| | | |
|---|---|---|
| 810,004 | Tabler | Jan. 16, 1906 |
| 1,199,247 | D'Arcy | Sept. 26, 1916 |
| 2,039,823 | Miller | May 5, 1936 |
| 2,172,302 | Tinnerman | Sept. 5, 1939 |
| 2,639,764 | Fernberg | May 26, 1953 |
| 2,649,898 | Quakenbush | Aug. 25, 1953 |